S. GODDARD.
TIRE CHAIN.
APPLICATION FILED NOV. 23, 1921.
1,418,373.
Patented June 6, 1922.
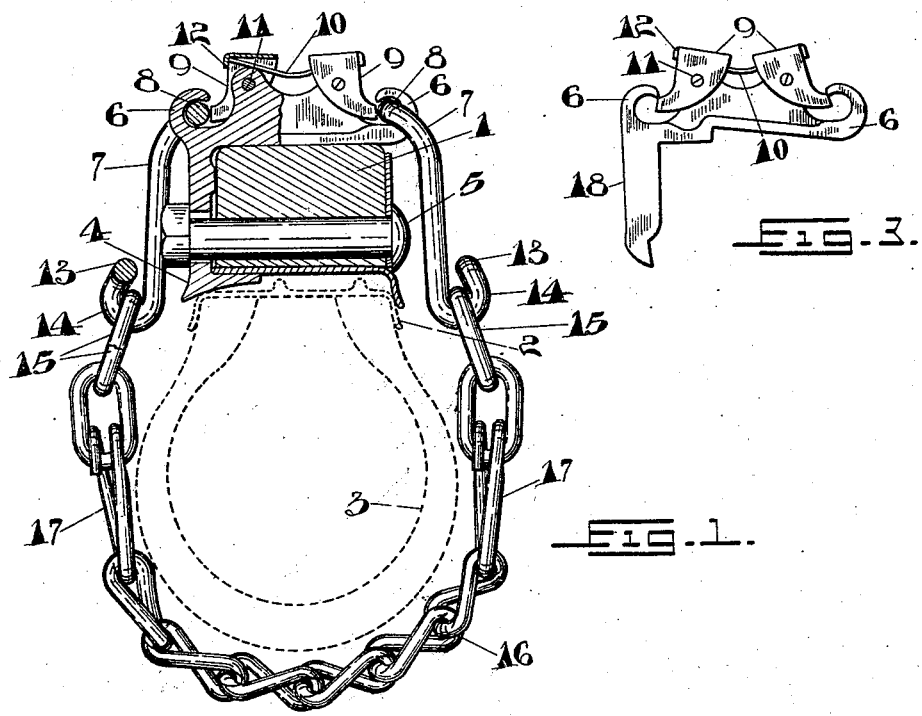
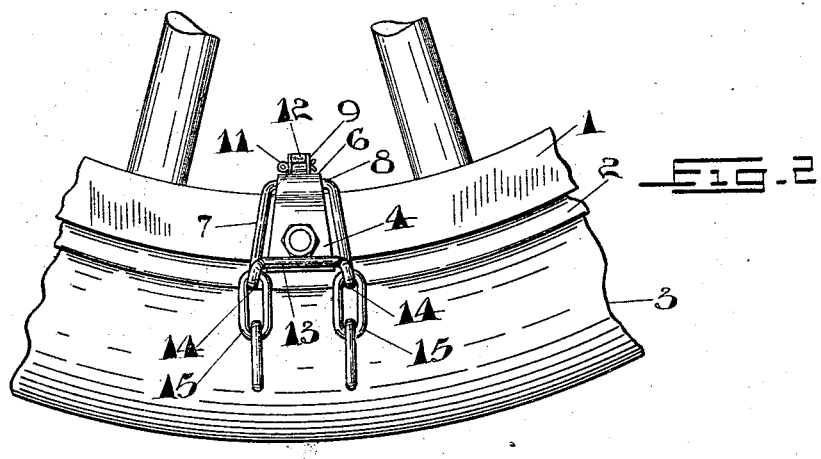
INVENTOR
S. Goddard
BY J. Edward Maybee.
ATTY.

UNITED STATES PATENT OFFICE.

STEWART GODDARD, OF TORONTO, ONTARIO, CANADA.

TIRE CHAIN.

1,418,373.  Specification of Letters Patent.  Patented June 6, 1922.

Application filed November 23, 1921. Serial No. 517,358.

*To all whom it may concern:*

Be it known that I, STEWART GODDARD, of the city of Toronto, in the county of York, Province of Ontario, Canada, a subject of the King of Great Britain, have invented certain new and useful Improvements in Tire Chains, of which the following is a specification.

This invention relates to tire chains of the type in which a plurality of short transverse chains are employed at different points around the circumference of a wheel, said chains being arranged in groups secured in place by suitable fastenings and my object is to devise means for securing the chains in place which will enable the operator to quickly and easily secure them in position or remove them, to combine the securing means with parts already employed with the wheel, and to provide means for repair which will entail the replacement of a minimum amount of chain.

I attain my object by means of the constructions hereinafter described and illustrated in the accompanying drawings in which—

Fig. 1 is a cross section through a wheel felloe rim and tire showing my improved tire chain in place;

Fig. 2 a side elevation of the same on a smaller scale; and

Fig. 3 an end elevation of a modified form of the hook.

In the drawings like numerals of reference indicate corresponding parts in the different figures.

1 is a wheel felloe which is provided with an ordinary detachable rim 2 which carries an ordinary pneumatic tire 3. The detachable rim is shown as held in place by the usual wedge members 4 and bolts 5. In one form of my invention I form integral with one step of the wedge members 4 hook members 6. Each hook member is provided with inwardly facing hooks, one at each side of the rim, these hooks being integrally connected with one another as shown.

With each pair of hooks I employ preferably a pair of chains which are connected with the connectors 7, which are formed as closed links, their ends 8 being adapted to be engaged in the hooks of the hook member 6. The connectors are retained in position in the hooks by means of pivoted gates 9, these gates being pivoted on the part of the member 6 intermediate the inwardly facing hooks, this part being preferably formed with a substantially parallel-sided rib extending transversely of the rim. The gates are each preferably formed of a single piece of sheet metal doubled to embrace the rib. The end of each gate is adapted to close the opening of the corresponding hook and these gates are yieldingly held in this position by a bent spring 10, the ends of which extend between the bearings of the pivots of the gates and the outer ends 12 of the gates.

As the pivots 11 are set inwardly from the mouths of the hooks and are located above the same, the gates will open either by the downward pressure of the connector when it is being pushed into position in the hook or by inward pressure of the connector against the end of the gate when the connector is being disengaged from the hook.

It will be noted that each connector 7 is formed of a closed link. The outer end 13 of the link is bent up to form at each side a loop 14. With each loop is engaged the end link 15 of a short piece of chain connected with one end of the traction chain 16. This chain connection includes a detachable member such, for example, as the split link 17. From this construction it is evident that if any one traction chain becomes worn and breaks, it may be easily and quickly renewed by detaching the links 17. The parts which require to be renewed are thus very short since the traction chain proper merely extends from one side to the other of the tread of the tire itself.

In Fig. 3 a modification of the hook member is shown, the connecting hook members being provided with a lug 18 at one side which is suitably shaped for connection by means of a bolt to a metal rim of the type now frequently employed.

While I have shown the device as applied to a pneumatic tire the device is equally applicable to solid tires, any necessary changes in form or size being such as will be within the scope of any person skilled in the art.

What I claim as my invention is:—

1. A wheel provided with a tire in combination with a plurality of tire chains side by side extending across the tire; two connector links, one at each side, to which the ends of the chains are connected; an inwardly facing hook member at each side of the wheel rim engageable by said connectors;

and a spring gate for each hook operable by pressure of a connector when the latter is being engaged with or disengaged from the hook.

2. A wheel provided with a tire in combination with a plurality of tire chains side by side extending across the tire; two connector links, one at each side, to which the ends of the chains are connected; integrally connected inwardly facing hook members, one at each side of the rim, engageable by said connectors; a gate for each hook pivoted on the connection between the hooks and operably by pressure of a connector when the latter is being engaged with or disengaged from the hook; and a spring common to the two gates, tending to hold said gates in their hook closing positions.

3. A wheel provided with a tire in combination with a plurality of tire chains side by side extending across the tire; two connector links, one at each side, to which the ends of the chains are connected; a securing member for a detachable rim; and hook members integral with said securing member engageable by said connectors.

4. A wheel provided with a tire in combination with a plurality of tire chains side by side extending across the tire; two integral closed connector links, one at each side, connections between said chains and the connectors, each including a removable link; an inwardly facing hook member at each side of the wheel felloe and engageable by said connectors.

5. A wheel provided with a tire in combination with two tire chains side by side across the tire; two connector links, one at each side, to which the ends of the chains are connected, each connector comprising an integral closed link having one end bent up to form a loop at each side with which the ends of the chains are connected; and hooks secured to the wheel rim with which the other ends of the connectors are engaged.

Signed at Toronto, Canada, this 11th day of November, 1921.

STEWART GODDARD.